US012080202B2

(12) United States Patent
Hong

(10) Patent No.: US 12,080,202 B2
(45) Date of Patent: Sep. 3, 2024

(54) DISPLAY DEVICE, DATA DRIVING CIRCUIT AND DISPLAY DRIVING METHOD

(71) Applicant: LG DISPLAY CO., LTD., Seoul (KR)

(72) Inventor: MooKyoung Hong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/865,308

(22) Filed: Jul. 14, 2022

(65) Prior Publication Data

US 2023/0068639 A1 Mar. 2, 2023

(30) Foreign Application Priority Data

Aug. 24, 2021 (KR) ........................ 10-2021-0111669

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2310/08* (2013.01); *G09G 2320/043* (2013.01); *G09G 2330/12* (2013.01)

(58) Field of Classification Search
None
See application file for complete search history.

(56) References Cited

U.S. PATENT DOCUMENTS

2012/0169578 A1* 7/2012 Kim ..................... G09G 3/3648 345/93
2016/0189615 A1* 6/2016 Kwon .................. G09G 3/3233 345/76
2017/0004776 A1* 1/2017 Park ..................... G09G 3/3233
2018/0293953 A1 10/2018 Im et al.
2020/0175923 A1* 6/2020 Kim ..................... G09G 3/3233

FOREIGN PATENT DOCUMENTS

CN 105741783 A 7/2016
CN 106328065 A 1/2017
CN 111028787 A 4/2020
KR 20170139287 A 12/2017

OTHER PUBLICATIONS

Chinese Office Action, dated May 28, 2024 issued in Patent Application No. 202210778979.X w/English Translation (14 pages).

* cited by examiner

*Primary Examiner* — Christopher J Kohlman
(74) *Attorney, Agent, or Firm* — POLSINELLI PC

(57) ABSTRACT

A display device includes a display panel having a plurality of sensing channels connected to a plurality of subpixels to detect a driving characteristic value, a data driving circuit including an analog-to-digital converter converting a sensing voltage detected through the plurality of sensing channels into digital sensing data and converting a subpixel driving voltage detected through at least one dummy channel into digital dummy sensing data, and a timing controller calculating an intensity of a current flowing through the data driving circuit based on the digital dummy sensing data transferred from the data driving circuit and compensating for image data transferred to the data driving circuit.

12 Claims, 12 Drawing Sheets

*FIG. 11*

| EVDD_S | EVDD | Estimated Current |
|---|---|---|
| Δ0 | Δ0 | ~ 1A |
| Δ0.05 | Δ0.45 | 0.5A |
| Δ0.1 | Δ0.9 | 2.2A |
| Δ0.15 | Δ1.35 | 3.5A |
| Δ0.2 | Δ1.8 | 4.7A |
| Δ0.25 | Δ2.25 | 5.9A |
| Δ0.3 | Δ2.7 | 7A |

DISPLAY DEVICE, DATA DRIVING CIRCUIT AND DISPLAY DRIVING METHOD

CROSS-REFERENCE TO RELATED APPLICATION

This application claims priority from Korean Patent Application No. 10-2021-0111669, filed on Aug. 24, 2021, which is hereby incorporated by reference in its entirety.

BACKGROUND

Field of the Disclosure

The present disclosure relates to a display device, a data driving circuit, and a display driving method that are capable of preventing defects and image quality degradation due to a change in subpixel driving voltage.

Description of the Background

As the information society develops, various demands for display devices for displaying images are increasing, and various types of display devices, such as liquid crystal displays (LCDs) and organic light emitting displays, are used.

Among these display devices, the organic light emitting diode display adopts organic light emitting diodes and thus has fast responsiveness and various merits in contrast ratio, luminous efficiency, brightness, and viewing angle.

The organic light emitting diode display include organic light emitting diodes in subpixels arranged on the display panel and emits the organic light emitting diodes by controlling the current flowing to the organic light emitting diodes, thereby controlling the brightness represented by each subpixel while displaying an image.

Such a display device includes a driving voltage supply source for supplying various driving voltages necessary for driving the display panel to the driving circuit and the display panel and various components for transferring the driving voltage.

In order for such a display device to normally display an image, the driving voltage should be normally transferred along the components for transferring the driving voltage.

However, since the driving voltage line for transferring the driving voltage is transferred through a specific driving circuit, high heat may be generated in an area where the driving voltage lines are dense, thereby causing an error in the operation of the driving circuit in which the driving voltage lines are positioned.

Further, if the temperature of the driving circuit increases, the driving voltage transferred through the driving circuit decreases due to the increase in temperature, so that a normal image may not be displayed on the display panel and image quality may be greatly degraded.

In particular, among various driving voltages used in the display device, the subpixel driving voltage supplied for driving the subpixel directly affects the quality of the display panel. However, there is no method for effectively detecting a change in subpixel driving voltage and compensating for it.

SUMMARY

Accordingly, the present disclosure is to provide a display device, a data driving circuit, and a display driving method that are capable of preventing defects and image quality degradation due to a change in subpixel driving voltage.

More specifically, the present disclosure is to provide a display device, a data driving circuit, and a display driving method that are capable of preventing defects and image quality degradation due to a change in subpixel driving voltage by detecting the subpixel driving voltage through the sensing line of the data driving circuit.

The present disclosure is also to provide a display device, a data driving circuit, and a display driving method capable of effectively detecting a change in subpixel driving voltage and preventing defects and image quality degradation by scaling the subpixel driving voltage to a sensing range of the analog-to-digital converter of the data driving circuit.

The present disclosure is also to provide a display device, a data driving circuit, and a display driving method capable of preventing defects and image quality degradation due to a change in subpixel driving voltage by detecting the subpixel driving voltage through the dummy channel of the data driving circuit.

The present disclosure is also to provide a display device, a data driving circuit, and a display driving method capable of preventing image quality degradation by controlling the data voltage applied to an area which has a significant change in subpixel driving voltage.

In an aspect of the present disclosure, a display device includes a display panel, where a plurality of sensing channels are disposed, the plurality of sensing channels connected to a plurality of subpixels to detect a driving characteristic value, a data driving circuit including an analog-to-digital converter converting a sensing voltage detected through the plurality of sensing channels into digital sensing data and converting a subpixel driving voltage detected through at least one dummy channel into digital dummy sensing data, and a timing controller calculating an intensity of a current flowing through the data driving circuit based on the digital dummy sensing data transferred from the data driving circuit and compensating for image data transferred to the data driving circuit.

In another aspect of the present disclosure, a data driving circuit includes a plurality of data lines extending to a display panel, where a plurality of subpixels are disposed, to supply a data voltage and an analog-to-digital converter converting a sensing voltage detected through the plurality of sensing channels into digital sensing data and converting a subpixel driving voltage detected through at least one dummy channel into digital dummy sensing data.

In a further aspect of the present disclosure, a method for driving a display device including a display panel where a plurality of subpixels are disposed, a data driving circuit including an analog-to-digital converter converting a sensing voltage detected through a plurality of sensing channels into digital sensing data, and a timing controller supplying image data to the data driving circuit, the method includes detecting a subpixel driving voltage through a dummy channel, calculating a current intensity corresponding to a variation width of the subpixel driving voltage, and compensating for the image data supplied to the data driving circuit according to the calculated current intensity.

BRIEF DESCRIPTION OF THE DRAWINGS

The above and other objects, features, and advantages of the present disclosure will be more clearly understood from the following detailed description, taken in conjunction with the accompanying drawings, in which:

FIG. 11 is a view illustrating an example of a lookup table for calculating the intensity of current flowing through a data driving circuit according to a variation width of a subpixel driving voltage in a display device according to aspects of the present disclosure.

DETAILED DESCRIPTION

Figure 1:
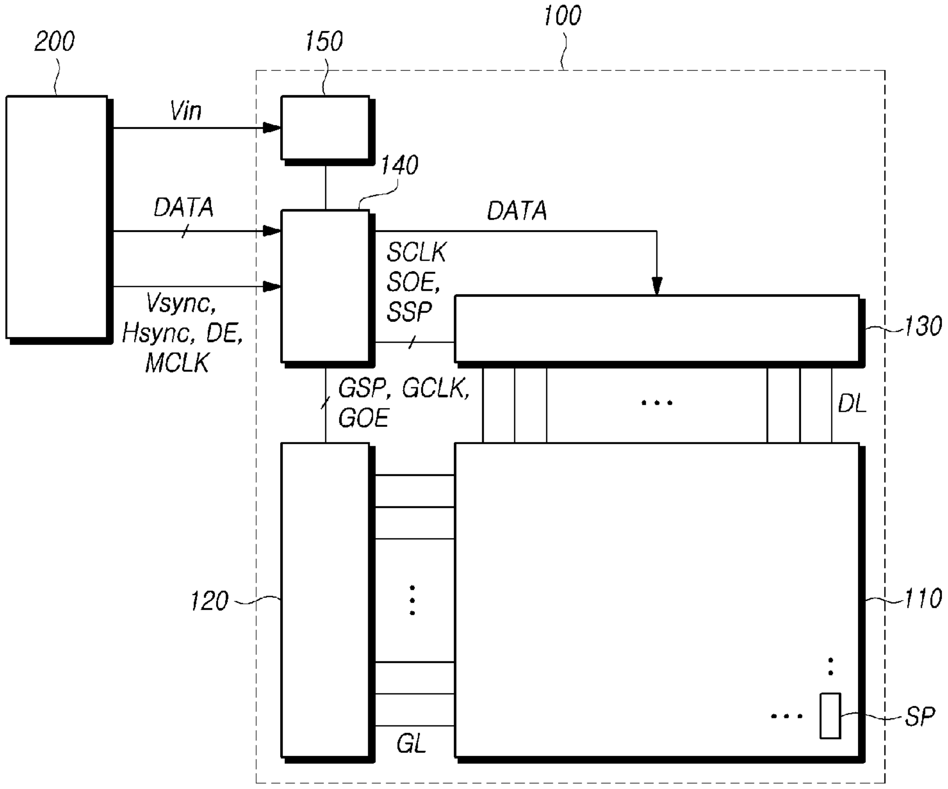
FIG. 1 is a view schematically illustrating a configuration of a display device according to various aspects of the present disclosure.

Hereinafter, some aspects of the present disclosure will be described in detail with reference to exemplary drawings. In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various aspects of the present disclosure will be described in detail with reference to the accompanying drawings.

FIG. 1 is a view schematically illustrating a configuration of a display device according to various aspects of the disclosure.

Referring to FIG. 1, a display device 100 according to aspects of the disclosure may include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit 150.

The display panel 110 displays an image based on a scan signal transferred from the gate driving circuit 120 through the plurality of gate lines GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be defined by the plurality of data lines DL and the plurality of gate lines GL.

One subpixel SP may include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed at the intersection between the gate line GL and the data line DL.

The gate driving circuit 120 may be controlled by the timing controller 140 to sequentially output scan signals to the plurality of gate lines GL disposed in the display panel 110, controlling the driving timing of the plurality of subpixels SP.

In the display device 100 having a resolution of 2,160×3,840, sequentially outputting the scan signal to the 2,160 gate lines GL from the first gate line to the 2,160th gate line may be referred to as 2,160-phase driving method. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving method. In other words, sequentially outputting the scan signal to every N gate lines GL may be referred to as N-phase driving method.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is applied through the gate line GL, each subpixel SP connected to the data line DL displays a light emitting signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 may control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device.

Accordingly, the timing controller 140 may generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source sampling clock SCLK is a clock signal that controls the timing of sampling data in the source driving integrated circuit SDIC. The source output enable signal SOE controls the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, to generate power required to drive the display panel 100, the gate driving circuit 120, and the data driving circuit 130.

The subpixel SP is positioned at the intersection between the gate line GL and the data line DL, and a light emitting element may be disposed in each subpixel SP. For example, the organic light emitting diode display may include a light emitting element, such as an organic light emitting diode, in each subpixel SP and may display an image by controlling the current flowing to the light emitting element according to the data voltage.

The display device 100 may be one of various types of devices, such as liquid crystal displays, organic light emitting displays, or plasma display panels.

Figure 2:
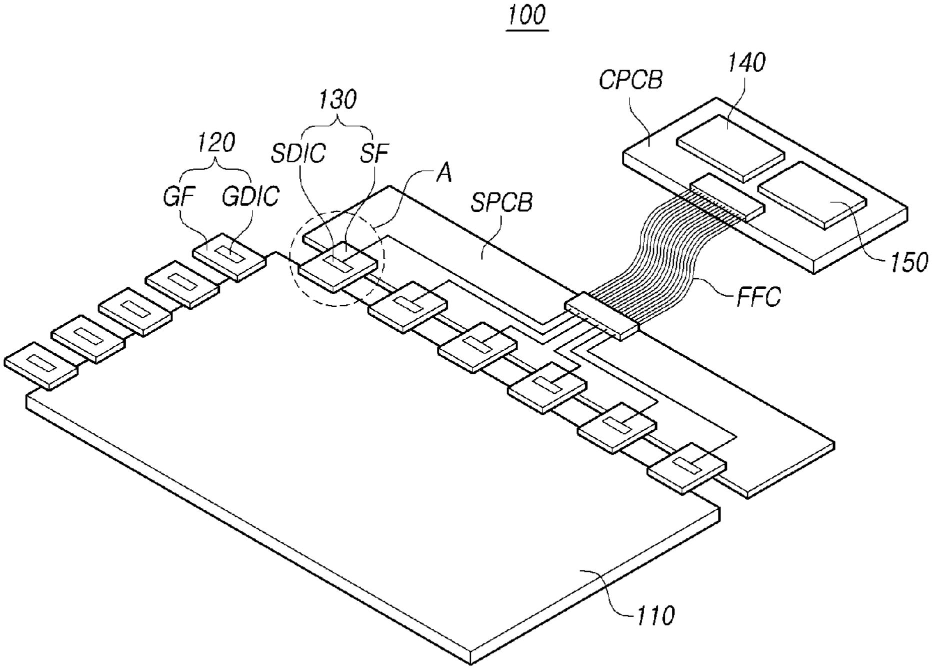
FIG. 2 is a view illustrating an example of a system of a display device according to aspects of the present disclosure.

FIG. 2 is a view illustrating an example of a system of a display device according to aspects of the disclosure.

Referring to FIG. 2, in the display device 100 according to aspects of the disclosure, the source driving integrated circuit SDIC included in the data driving circuit 130 and the gate driving integrated circuit GDIC included in the gate driving circuit 120 are implemented in the chip-on-film (COF) type among various types (e.g., TAB, COG, or COF).

One or more gate driving integrated circuits GDIC included in the gate driving circuit 120 each may be mounted on a gate film GF, and one side of the gate film GF may be electrically connected with the display panel 110. Lines for electrically connecting the gate driving integrated circuit GDIC and the display panel 110 may be disposed on the gate film GF.

Likewise, one or more source driving integrated circuits SDIC included in the data driving circuit 130 each may be mounted on the source film SF, and one side of the source film SF may be electrically connected with the display panel 110. Lines for electrically connecting the source driving integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit (power management IC) 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit (FPC) or a flexible flat cable (FFC). In this case, the connection member connecting the at least one source printed circuit board SPCB and control printed circuit board CPCB may be varied depending on the size and type of the display device 100. The at least one source printed circuit board SPCB and control printed circuit board CPCB may be integrated into a single printed circuit board.

In the so-configured display device 100, the power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include an organic light emitting diode, which is a light emitting element, and a circuit element, e.g., a driving transistor, for driving the organic light emitting diode.

The type and number of circuit elements constituting each subpixel SP may be varied depending on functions to be provided and design schemes.

Figure 3:
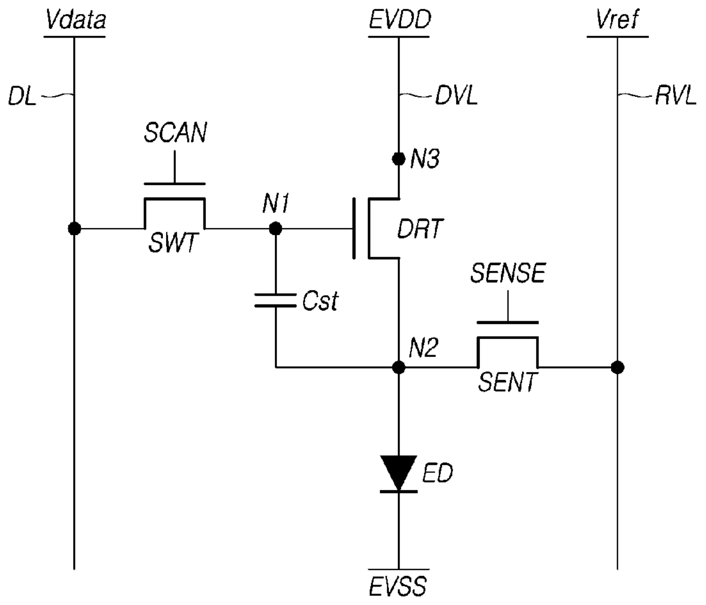
FIG. 3 is a view illustrating an example of a circuit constituting a subpixel in a display device according to aspects of the present disclosure.

FIG. 3 is a view illustrating an example of a circuit constituting a subpixel in a display device according to aspects of the disclosure.

Referring to FIG. 3, in the display device 100 according to aspects of the disclosure, the subpixel SP may include one or more transistors, a capacitor and an organic light emitting diode (OLED) as a light emitting element ED.

For example, the subpixel SP may include a driving transistor DRT, a switching transistor SWT, a sensing transistor SENT, a storage capacitor Cst, and a light emitting element ED.

The driving transistor DRT includes the first node N1, second node N2, and third node N3. The first node N1 of the driving transistor DRT may be a gate node to which the data voltage Vdata is applied from the data driving circuit 130 through the data line DL when the switching transistor SWT is turned on. The second node N2 of the driving transistor DRT may be electrically connected with the anode electrode of the light emitting element ED and may be the source node or drain node. The third node N3 of the driving transistor DRT may be electrically connected with the driving voltage line DVL to which the subpixel driving voltage EVDD is applied and may be the drain node or the source node.

In this case, during a display driving period, a subpixel driving voltage EVDD necessary for displaying an image may be supplied to the driving voltage line DVL. For example, the subpixel driving voltage EVDD necessary for displaying an image may be 27 V.

The switching transistor SWT is electrically connected between the first node N1 of the driving transistor DRT and the data line DL, and the gate line GL is connected to the gate node of the switching transistor SWT. Thus, the switching transistor SWT is operated according to the scan signal SCAN supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node of the sensing transistor SENT. The sensing transistor SENT is operated according to the sense signal SENSE supplied through the gate line GL. When the sensing transistor SENT is turned on, a sensing reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the light emitting element ED may be supplied.

The gate nodes of the switching transistor SWT and the sensing transistor SENT may be commonly connected to one gate line GL or may be connected to different gate lines GL. An example is shown in which the switching transistor SWT and the sensing transistor SENT are connected to different gate lines GL in which case the switching transistor SWT and the sensing transistor SENT may be independently controlled by the scan signal SCAN and the sense signal SENSE transferred through different gate lines GL.

In contrast, if the switching transistor SWT and the sensing transistor SENT are connected to one gate line GL, the switching transistor SWT and the sensing transistor SENT may be simultaneously controlled by the scan signal SCAN or sense signal SENSE transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting element ED may be electrically connected with the second node N2 of the driving transistor DRT, and a base voltage EVSS may be applied to the cathode electrode of the light emitting element ED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The structure of the subpixel SP described above as an example is a 3T (transistor) 1C (capacitor) structure, which is merely an example for description, and may further include one or more transistors or, in some cases, one or more capacitors. The plurality of subpixels SP may have the same structure, or some of the plurality of subpixels SP may have a different structure.

To effectively sense a characteristic value, e.g., threshold voltage or mobility, of the driving transistor DRT, the display device 100 according to aspects of the disclosure may use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel SP. Thus, the reference voltage line RVL may also be referred to as a sensing line.

In this case, the period for sensing the driving characteristic values (threshold voltage and mobility) of the driving transistor DRT may be performed after the power-on signal is generated and before the display driving starts. For example, if a power-on signal is applied to the display device 100, the timing controller 140 loads parameters necessary for driving the display panel 110 and then drives the display. In this case, the parameters necessary for driving the display panel 110 may include information about the sensing and compensation for driving characteristic values previously performed on the display panel 110. In the parameter loading process, the sensing of driving characteristic values (threshold voltage and mobility) of the driving transistor DRT may be performed. As described above, a process in which the driving characteristic value is sensed in the parameter loading process after the power-on signal is generated is referred to as an on-sensing process.

Alternatively, a period in which the driving characteristic value of the driving transistor DRT is sensed may proceed after a power-off signal of the display device 100 is generated. For example, when a power-off signal is generated in the display device 100, the timing controller 140 may cut off the data voltage supplied to the display panel 110 and may sense the driving characteristic value of the driving transistor DRT for a predetermined time. As such, a process in which a driving characteristic value is sensed in a state in which the data voltage is cut off as a power-off signal is generated is referred to as an off-sensing process.

Alternatively, the sensing period for the driving characteristic value of the driving transistor DRT may be performed in real time while the display is driven. This sensing process is referred to as a real-time (RT) sensing process. In the real-time sensing process, the sensing process may be performed on one or more subpixels SP in one or more subpixel SP lines, in each blank period during the display driving period.

Figure 4:
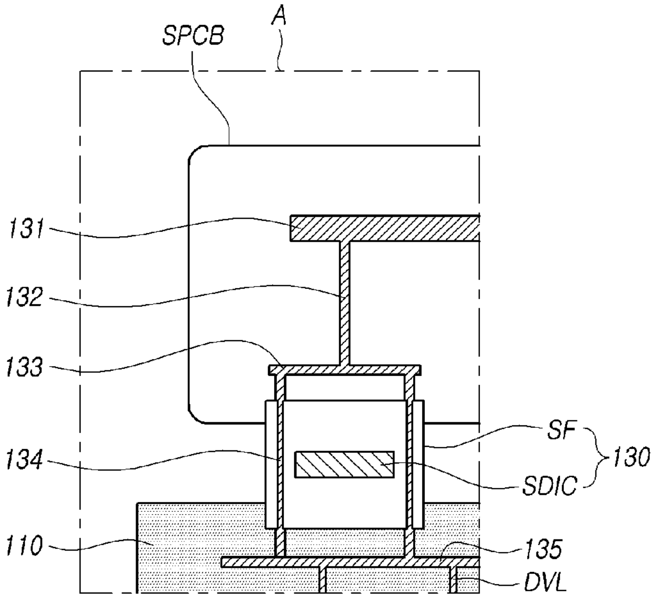
FIG. 4 is a view illustrating an example of a transfer path of a subpixel driving voltage in a display device according to aspects of the present disclosure.

FIG. 4 is a view illustrating an example of a transfer path of a subpixel driving voltage in a display device according to aspects of the disclosure. Here, portion A shown in FIG. 2 is enlarged and illustrated.

Referring to FIG. 4, in the display device 100 according to aspects of the disclosure, a plurality of subpixels SP defined by a plurality of data lines DL and a plurality of gate lines GL crossing each other are disposed on the display panel 110. In this case, each subpixel SP receives the subpixel driving voltage EVDD through a plurality of driving voltage lines DVL arranged in a direction parallel to the plurality of data lines DL.

The plurality of driving voltage lines DVL may be formed between the plurality of data lines DL to be parallel to the plurality of data lines DL or may be formed to be shared by two subpixels adjacent to each other in the left and right directions.

The plurality of driving voltage lines DVL may be commonly connected to the common driving voltage line 135 formed in the upper non-display area of the display panel 110.

The subpixel driving voltage EVDD transferred from the power management circuit 150 is supplied to the common driving voltage line 135 through the plurality of data driving circuits 130.

To transfer the subpixel driving voltage EVDD to the plurality of driving voltage lines DVL, a first driving voltage supply line 131, a second driving voltage supply line 132, a third driving voltage supply line 133, and a fourth driving voltage supply line 134 may be disposed.

The first driving voltage supply line 131, the second driving voltage supply line 132, and the third driving voltage supply line 133 may be electrically connected to the source printed circuit board SPCB.

The fourth driving voltage supply line 134 may be branched to two opposite sides of the source driving integrated circuit SDIC in the data driving circuit 130 and may electrically connect the third driving voltage supply line 133 with the common driving voltage line 135.

The third driving voltage supply line 133 may be disposed in an area adjacent to the source film SF and may be electrically connected to the fourth driving voltage supply line 134 formed in the data driving circuit 130.

Since the first driving voltage supply line 131 corresponds to a portion to which the subpixel driving voltage EVDD supplied from the power management circuit 150 is applied, the first driving voltage supply line 131 may be formed to have a relatively larger area than the third driving voltage supply line 133.

The second driving voltage supply line 132 may be branched from the first driving voltage supply line 131 to have a predetermined interval and is connected to the third driving voltage supply line 133.

In this case, since the second driving voltage supply line 132 is positioned in an area before the subpixel driving voltage EVDD is branched through the plurality of driving voltage lines DVL, the second driving voltage supply line 132 has a relatively high current density as compared to the fourth driving voltage supply line 134 and the driving voltage line DVL.

Accordingly, the second driving voltage supply line 132 has a high chance of an increase in temperature and a defect due to the high-density current.

Meanwhile, the data driving circuit 130 may form several source driving integrated circuits SDIC into a group to supply the subpixel driving voltage EVDD on a per-group basis.

Figure 5:
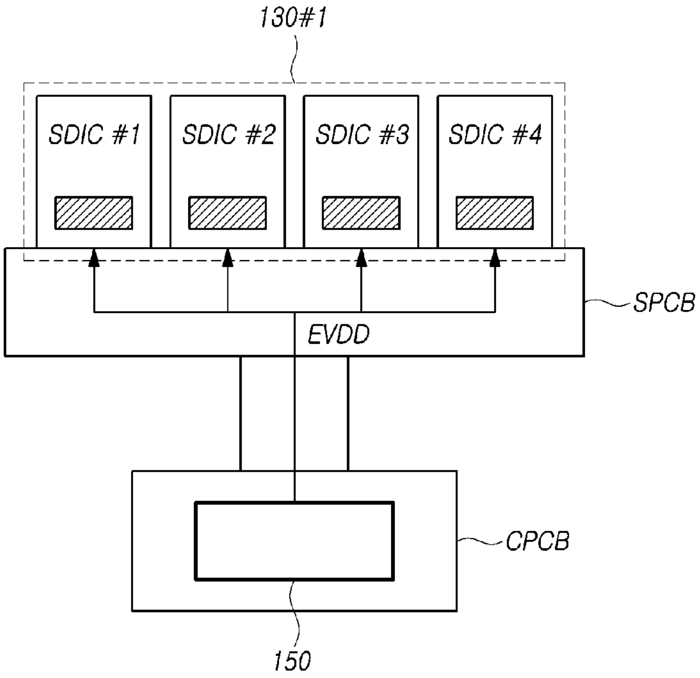
FIG. 5 is a view illustrating an example in which in a display device, a data driving circuit group is constituted of a plurality of source driving integrated circuits to supply a subpixel driving voltage according to aspects of the present disclosure.

FIG. 5 is a view illustrating an example in which in a display device, a data driving circuit group is constituted of a plurality of source driving integrated circuits to supply a subpixel driving voltage according to aspects of the disclosure.

Referring to FIG. 5, in the display device 100 according to aspects of the disclosure, the subpixel driving voltage EVDD generated from the power management circuit 150 is transferred to the subpixel SP through the source printed circuit board SPCB and the data driving circuit 130.

Illustrated here is an example in which one data driving circuit group 130 #1 is constituted of, e.g., four source driving integrated circuits SDIC #1 to SDIC #4.

In this case, the subpixel driving voltage EVDD supplied from the power management circuit 150 may be supplied through the source printed circuit board SPCB where the four source driving integrated circuits SDIC #1 to SDIC #4 are disposed and be branched through four driving voltage lines DVL on the source printed circuit board SPCB.

The subpixel driving voltages EVDD transferred through the four driving voltage lines DVL branched on the source printed circuit board SPCB are to be supplied to the corresponding subpixels SP through the source films SF where the four source driving integrated circuits SDIC #1 to SDIC #4 are mounted.

In this case, since current is most concentrated in the central portion of the source printed circuit board SPCB to which the subpixel driving voltage EVDD is supplied from the power management circuit 150, the temperature may rise and defects may occur.

Figure 6:
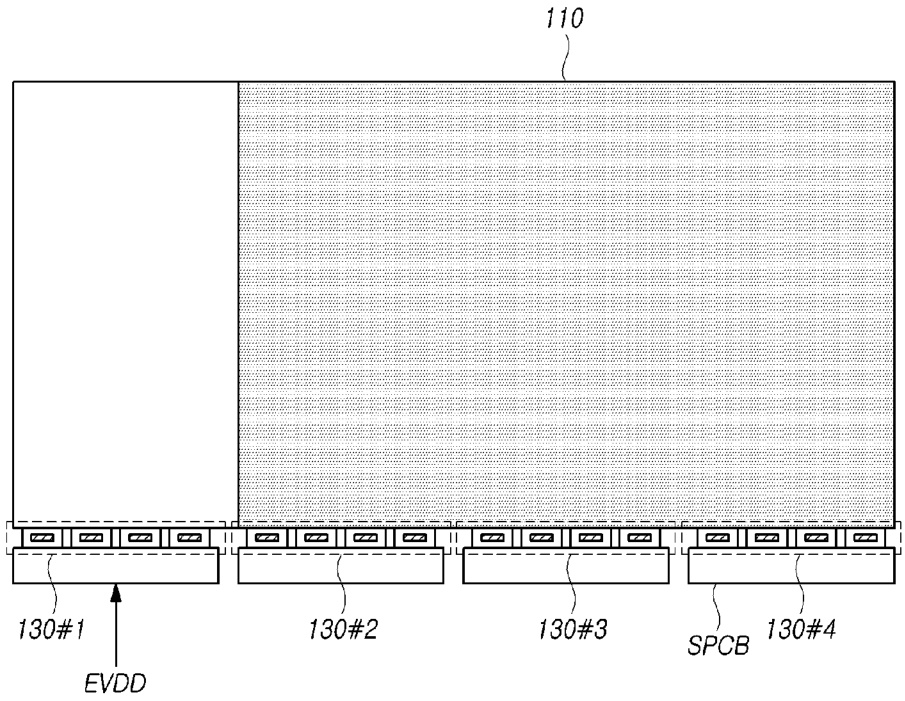
FIG. 6 is a view illustrating an example in which image quality is degraded due to an increase in temperature by a subpixel driving voltage in a specific area in a display device.

FIG. 6 is a view illustrating an example in which image quality is degraded due to an increase in temperature by a subpixel driving voltage in a specific area in a display device.

Referring to FIG. 6, the data driving circuit 130 of the display device 100 may be driven, with several source driving integrated circuits SDIC bundled up into one group.

As shown here, when the four source driving integrated circuits SDIC #1 to SDIC #4 are configured as one data driving circuit group 130 #1 to 130 #4, the subpixel driving voltage EVDD may be supplied per data driving circuit group 130 #1 to 130 #4.

In this case, depending on the type of image displayed on the display panel 110, the current applied to the source printed circuit board SPCB of a specific area may increase, so that the temperature of the area may increase, and the image quality may degrade.

For example, when the current applied to a first data driving circuit group 130 #1 is higher than those applied to the other data driving circuit groups 130 #2, 130 #3, and 130 #4, the temperature of the first data driving circuit group 130 #1 increases.

When the temperature of the first data driving circuit group 130 #1 increases, the first data driving circuit group 130 #1 may degrade, and the subpixel driving voltage EVDD transferred through the first data driving circuit group 130 #1 is decreased, so that a normal image may not be displayed on the display panel 110 and image quality may be greatly degraded.

Accordingly, it is possible to enhance image quality by detecting a variation in the subpixel driving voltage EVDD transferred through the data driving circuit 130 through a dummy sensing line and reflecting it to control the image data DATA supplied to the data driving circuit 130.

Figure 7:
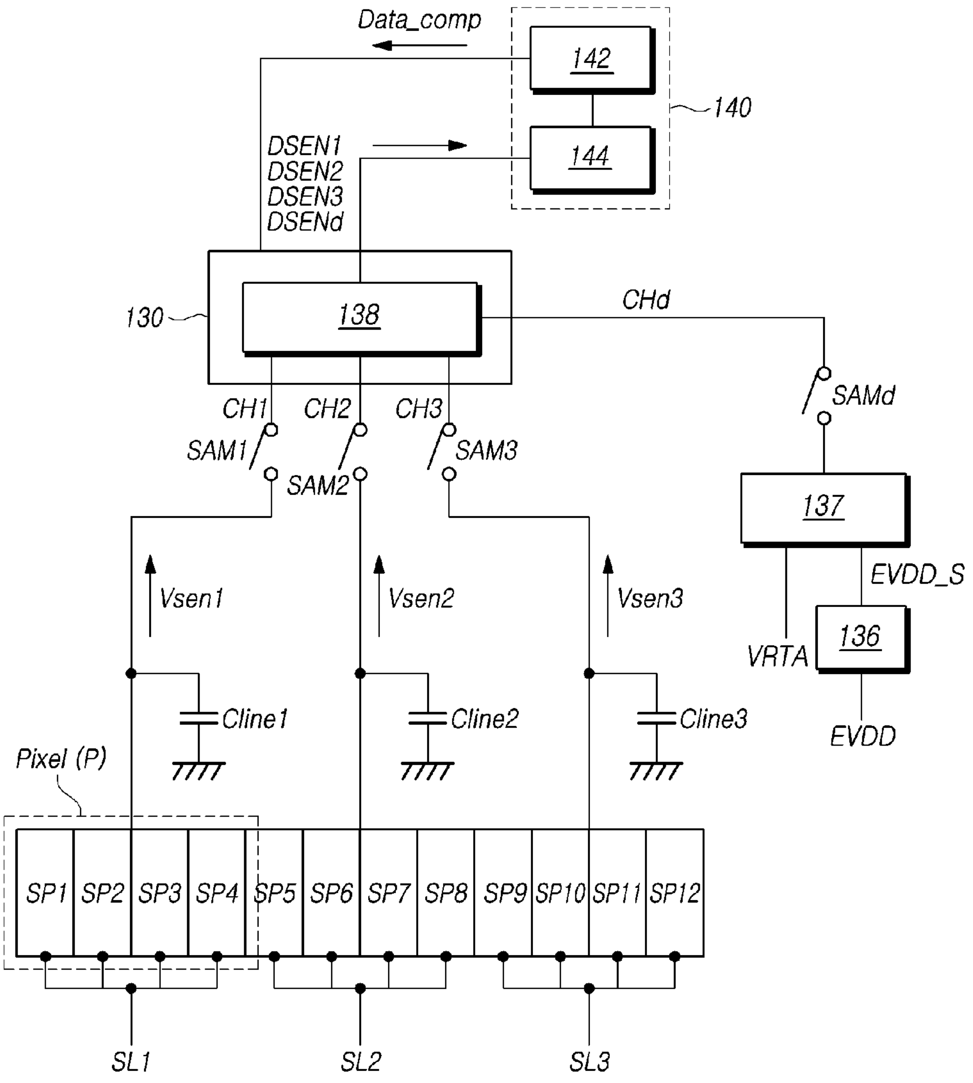
FIG. 7 is a view illustrating an example of a structure of detecting a variation in subpixel driving voltage through a dummy sensing line and compensating for it in a display device according to aspects of the present disclosure.

FIG. 7 is a view illustrating an example of a structure of detecting a variation in subpixel driving voltage through a dummy sensing line and compensating for it in a display device according to aspects of the disclosure.

Referring to FIG. 7, in the display device 100 according to aspects of the disclosure, the analog-to-digital converter 138 included in the data driving circuit 130 may include three sensing channels CH1, CH2, and CH3 and one dummy channel CHd.

The three sensing channels CH1, CH2, and CH3, respectively, may be connected to three sensing lines SL1, SL2, and SL3 through sampling switches SAM1, SAM2, and SAM3, and each of the three sensing lines SL1, SL2, and SL3 may be connected to four subpixels SP.

In other words, the first sensing line SL1 corresponding to the first sensing channel CH1 may be shared by and connected to the first to fourth subpixels SP1, SP2, SP3, and SP4. Similarly, the second sensing line SL2 corresponding to the second sensing channel CH2 may be shared by and connected to the fifth to eighth subpixels SP5, SP6, SP7, and SP8. The third sensing line SL3 corresponding to the third sensing channel CH3 may be shared by and connected to the ninth to twelfth subpixels SP9, SP10, SP11, and SP12.

In other words, four subpixels SP may constitute one pixel P. For example, the four subpixels SP may include a red subpixel R, a white subpixel W, a green subpixel G, and a blue subpixel B. For example, the first subpixel SP1, the fifth subpixel SP5, and the ninth subpixel SP9 may be red subpixels R. The second subpixel SP2, the sixth subpixel SP6, and the tenth subpixel SP10 may be white subpixels W. The third subpixel SP3, the seventh subpixel SP7, and the eleventh subpixel SP11 may be a green subpixels G. The fourth subpixel SP4, the eighth subpixel SP8, and the twelfth subpixel SP12 may be blue subpixels B.

Meanwhile, in one dummy channel CHd, an off-sensing voltage VRTA or subpixel driving voltage EVDD may be applied to the analog-to-digital converter 138 through the dummy sampling switch SAMd.

The off-sensing voltage VRTA is a voltage separately applied to detect the gain or offset characteristics of the analog-to-digital converter 138. The off-sensing voltage VRTA may have a value within a range convertible by the analog-to-digital converter 138.

In contrast, when the gain or offset characteristic of the analog-to-digital converter 138 is not detected, the off-sensing voltage VRTA may not be applied to the dummy channel CHd.

Since the dummy channel CHd is not electrically connected to the subpixels SP constituting the display panel 110, the dummy sensing voltage Vsend detected through the dummy channel CHd may be used to compensate for the gain or offset of the analog-to-digital converter 138 or may also be used to detect the subpixel driving voltage EVDD.

In this case, the subpixel driving voltage EVDD generally has a high voltage level of 20 V or more. In contrast, the voltage input to the analog-to-digital converter 138 has a range between 0 V and several volts.

Accordingly, the level of the subpixel driving voltage EVDD may be converted within a range convertible by the analog-to-digital converter 138 through a first scaler 136.

Figure 8:
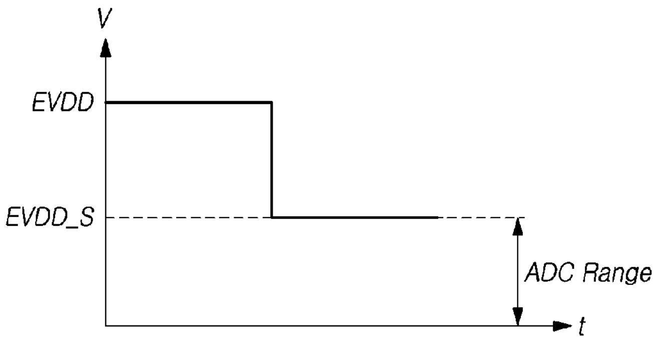
FIG. 8 is a view illustrating an example of an input voltage range of an analog-to-digital converter and a subpixel driving voltage in a display device according to aspects of the present disclosure.

FIG. 8 is a view illustrating an example of an input voltage range of an analog-to-digital converter and a subpixel driving voltage in a display device according to aspects of the disclosure.

Described below is a process for detecting a variation in the subpixel driving voltage EVDD transferred through the data driving circuit 130 during the display driving period through the dummy channel CHd and reflecting it to control the image data DATA supplied to the data driving circuit 130.

Referring to FIG. 8, in the display device 100 according to aspects of the disclosure, the subpixel driving voltage EVDD may be 27V, and the range (ADC range) of the voltage input to the analog-to-digital converter 138 constituting the data driving circuit 130 may be 0 V to 3 V.

Accordingly, the first scaler 136 may scale the subpixel driving voltage EVDD to a value within the input voltage range (ADC range) of the analog-to-digital converter 138 and supply it.

The subpixel driving voltage EVDD_S scaled to a value within the input voltage range of the analog-to-digital converter 138 within the display driving period may be provided to the analog-to-digital converter 138 through the dummy sampling switch SAMd. In other words, the analog-to-digital converter 138 may detect the scaled subpixel driving voltage EVDD_S through the dummy channel CHd within the display driving period.

Accordingly, the analog-to-digital converter 138 may convert the scaled subpixel driving voltage EVDD_S, detected through one dummy channel CHd, into digital dummy sensing data DSENd and output the digital dummy sensing data DSENd, and the timing controller 140 may store the digital dummy sensing data DSENd in the memory 144.

Accordingly, the compensation circuit 142 may detect a variation width of the subpixel driving voltage EVDD from the digital dummy sensing data DSENd transferred from the dummy channel CHd and calculate the intensity of the current transferred through the data driving circuit 130 and a change in the temperature of the data driving circuit 130 based on the detected variation width.

As a result, the display device 100 according to aspects of the disclosure may detect a high current when the high current flows through the data driving circuit 130 and control the image data DATA applied to the data driving circuit 130, thereby mitigating the increase in the temperature of the data driving circuit 130 while preventing defects in the signal line of, e.g., the data driving circuit 130 and the source film SF.

In this case, current intensities and changes in the temperature of the data driving circuit 130 corresponding to variation widths of the subpixel driving voltage EVDD may be stored, in the form of a lookup table, in the memory 144.

The compensation circuit 142 may be present inside or outside the timing controller 140. The memory 144 may be positioned outside the timing controller 140 or may be implemented, in the form of a register, inside the timing controller 140.

Although it is illustrated that the first scaler 136 for adjusting the range of the subpixel driving voltage EVDD and the switching circuit 137 capable of selecting the scaled subpixel driving voltage EVDD_S are positioned outside the data driving circuit 130, the first scaler 136 and the switching circuit 137 may be positioned inside the data driving circuit 130 or may be configured, as circuitry, on the source printed circuit board SPCB.

Meanwhile, upon detecting both the variation in the subpixel driving voltage EVDD and the offset of the analog-to-digital converter ADC through the dummy channel CHd, the off-sensing voltage VRTA and the scaled subpixel driving voltage EVDD_S may be supplied to the switching circuit 137. As described above, when the gain or offset characteristic of the analog-to-digital converter 138 is not detected, the off-sensing voltage VRTA may not be applied to the dummy channel CHd.

The switching circuit 137 may provide the off-sensing voltage VRTA or the scaled subpixel driving voltage EVDD_S to the analog-to-digital converter 138 at different times.

For example, the off-sensing voltage VRTA may be applied to the analog-to-digital converter 138 during the period when the power off signal is applied to the display device 100, and the off-sensing process for detecting the characteristic value of the driving transistor DRT proceeds.

In contrast, the scaled subpixel driving voltage EVDD_S may be applied to the analog-to-digital converter 138 during the display driving period.

When the off-sensing process proceeds, the analog-to-digital converter 138 may detect the sensing voltage Vsen1 for one subpixel (e.g., SP1) among the four subpixels SP1, SP2, SP3, and SP4 connected with the first sensing line SL1 at a first time. Likewise, the analog-to-digital converter 138 may detect the sensing voltage Vsen2 for one subpixel (e.g., SP5) among the four subpixels SP5, SP6, SP7, and SP8 connected with the second sensing line SL2 and may detect the sensing voltage Vsen3 for one subpixel (e.g., SP9) among the four subpixels SP9, SP10, SP11, and SP12 connected with the third sensing line SL3.

At a second time after the first time, the analog-to-digital converter 138 may detect the sensing voltage Vsen1 for another subpixel (e.g., SP2) among the four subpixels SP1, SP2, SP3, and SP4 connected with the first sensing line SL1. Likewise, the analog-to-digital converter 138 may detect the sensing voltage Vsen2 for another subpixel (e.g., SP6) among the four subpixels SP5, SP6, SP7, and SP8 connected with the second sensing line SL2 and may detect the sensing voltage Vsen3 for another subpixel (e.g., SP10) among the four subpixels SP9, SP10, SP11, and SP12 connected with the third sensing line SL3.

In this case, the analog-to-digital converter 138 may control the sampling switches SAM1, SAM2, and SAM3, simultaneously or individually detecting the sensing voltages Vsen for three subpixels through the three sensing lines SL1, SL2, and SL3.

For example, at a first time, the analog-to-digital converter 138 may simultaneously turn on the sampling switches SAM1, SAM2, and SAM3, simultaneously detecting the sensing voltages Vsen1, Vsen2, and Vsen3 for the first subpixel SP1, the fifth subpixel SP5, and the ninth subpixel SP9 corresponding to red subpixels R through the first sensing line SL1, the second sensing line SL2, and the third sensing line SL3, respectively.

Further, at a second time, the analog-to-digital converter 138 may simultaneously turn on the sampling switches SAM1, SAM2, and SAM3, simultaneously detecting the sensing voltages Vsen1, Vsen2, and Vsen3 for the second subpixel SP2, the sixth subpixel SP6, and the tenth subpixel SP10 corresponding to white subpixels W through the first sensing line SL1, the second sensing line SL2, and the third sensing line SL3, respectively.

Further, at a third time, the analog-to-digital converter 138 may simultaneously turn on the sampling switches SAM1, SAM2, and SAM3, simultaneously detecting the sensing voltages Vsen1, Vsen2, and Vsen3 for the third subpixel SP3, the seventh subpixel SP7, and the eleventh subpixel SP11 corresponding to green subpixels G through the first sensing line SL1, the second sensing line SL2, and the third sensing line SL3, respectively.

At a fourth time, the analog-to-digital converter 138 may simultaneously turn on the sampling switches SAM1, SAM2, and SAM3, simultaneously detecting the sensing voltages Vsen1, Vsen2, and Vsen3 for the four subpixel SP4, the eighth subpixel SP8, and the twelfth subpixel SP12 corresponding to blue subpixels B through the first sensing line SL1, the second sensing line SL2, and the third sensing line SL3, respectively.

In this case, line capacitors Cline1, Cline2, and Cline3 storing the sensing voltages Vsen for the sensing nodes of the corresponding subpixels are connected to the three sensing lines SL1, SL2, and SL3, respectively. In other words, the sensing voltage Vsen1 for the subpixel detected among the four subpixels SP1, SP2, SP3, and SP4 connected to the first sensing line SL1 is stored in the first line capacitor Cline1 connected to the first sensing line SL 1. Further, the sensing voltage Vsen2 for the subpixel detected among the four subpixels SP5, SP6, SP7, and SP8 connected to the second sensing line SL2 is stored in the second line capacitor Cline2 connected to the second sensing line SL2, and the sensing voltage Vsen3 for the subpixel detected among the four subpixels SP9, SP10, SP11, and SP12 connected to the third sensing line SL3 is stored in the third line capacitor Cline3 connected to the third sensing line SL3.

Accordingly, the analog-to-digital converter 138 may simultaneously or individually detect the sensing voltages Vsen1, Vsen2, and Vsen3 stored in the three line capacitors Cline1, Cline2, and Cline3, thereby measuring the three sensing voltages Vsen1, Vsen2, and Vsen3 through three sensing channels CH1, CH2, and CH3. Accordingly, the analog-to-digital converter 138 may control the dummy sampling switch SAMd during the off-sensing process, thereby detecting the off-sensing voltage VRTA through the dummy channel CHd.

In this case, the analog-to-digital converter 138 may convert the data voltages Vsen1, Vsen2, and Vsen3 detected through the three sensing channels CH1, CH2, and CH3 into digital sensing data DSEN1, DSEN2, and DSEN3, convert the off-sensing voltage VRTA detected through one dummy channel CHd into the digital dummy sensing data DSENd, and output the digital dummy sensing data DSENd. The timing controller 140 may store the digital dummy sensing data DSENd in the memory 144.

The compensation circuit 142 may read the digital sensing data DSEN1, DSEN2, and DSEN3 transferred from the sensing channels CH1, CH2, and CH3, compensate for the image data DATA to be supplied to the subpixel SP, and output the compensated digital image data DATA_comp to the data driving circuit 130.

Accordingly, during the off-sensing process, the compensation circuit 142 may detect the gain or offset of the analog-to-digital converter 138 from the digital dummy sensing data DSENd transferred from the dummy channel CHd and change the reference value stored in the memory 144, thereby compensating for it.

Figure 9:
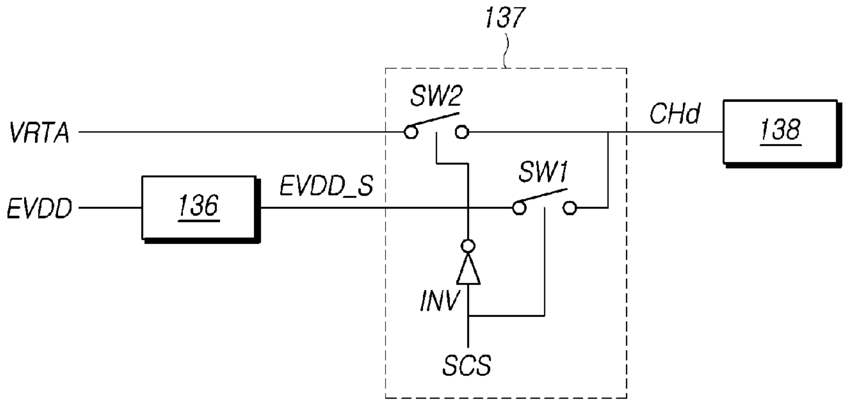
FIG. 9 is a view illustrating an example of a switching circuit for transferring an off-sensing voltage and a subpixel driving voltage to an analog-to-digital converter in a display device according to aspects of the present disclosure.

FIG. 9 is a view illustrating an example of a switching circuit for transferring an off-sensing voltage and a subpixel driving voltage to an analog-to-digital converter in a display device according to aspects of the disclosure.

The switching circuit 137 may be used to detect a variation in the subpixel driving voltage EVDD during the display driving period and detect the gain or offset of the analog-to-digital converter ADC during the off-sensing process.

Referring to FIG. 9, in the display device 100 according to aspects of the disclosure, the subpixel driving voltage EVDD may be scaled to a range of the input voltage of the analog-to-digital converter 138 through the first scaler 136.

Accordingly, the off-sensing voltage VRTA and the scaled subpixel driving voltage EVDD_S may be supplied to the switching circuit 137, and the switching circuit 137 may provide the off-sensing voltage VRTA or the scaled subpixel driving voltage EVDD_S to the analog-to-digital converter 138 at different times.

To that end, the switching circuit 137 may include a first switch SW1 to which the scaled subpixel driving voltage EVDD_S is transferred and a second switch SW2 to which the off-sensing voltage VRTA for detecting the gain or offset of the analog-to-digital converter 138 is transferred.

Opposite signals may be applied by the inverter INV so that the first switch SW1 and the second switch SW2 may be turned on at different times.

In other words, the on-off of the first switch SW1 is controlled by the switching control signal SCS, but the on-off of the second switch SW2 may be controlled by the inverted signal of the switching control signal SCS through the inverter INV.

In the structure, since the first switch SW1 is turned on by the switching control signal SCS during the display driving period, and the second switch SW2 is turned off, the scaled subpixel driving voltage EVDD_S is supplied to the analog-to-digital converter 138.

In contrast, at the time when the display driving period is terminated, e.g., during the off-sensing process, the first switch SW1 is turned off, and the second switch SW2 is turned on, so that the off-sensing voltage VRTA may be supplied to the analog-to-digital converter 138.

Accordingly, the switching control signal SCS may be used as a signal for identifying the display driving period of the display device 100.

Figure 10:
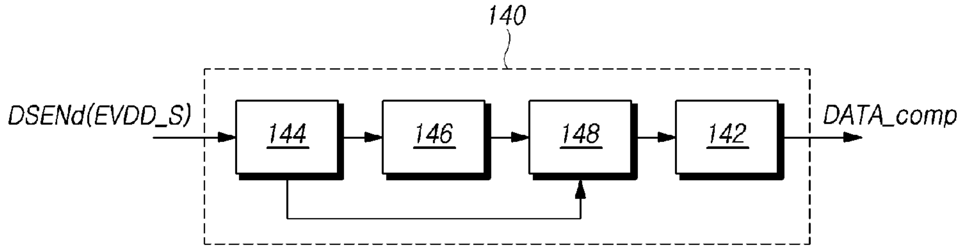
FIG. 10 is a view illustrating an example of a configuration of a timing controller for compensating for image data according to a variation in subpixel driving voltage in a display device according to aspects of the present disclosure.

FIG. 10 is a view illustrating an example of a configuration of a timing controller for compensating for image data according to a variation in subpixel driving voltage in a display device according to aspects of the disclosure.

Referring to FIG. 10, in the display device 100 according to aspects of the disclosure, the timing controller 140 may include a memory 144, a second scaler 146, a current calculation circuit 148, and a compensation circuit 142.

The subpixel driving voltage EVDD_S scaled to the input voltage level of the analog-to-digital converter 138 within the display driving period may be detected through the dummy channel CHd. The analog-to-digital converter 138 converts the scaled subpixel driving voltage EVDD_S into digital dummy sensing data DSENd and transfers it to the timing controller 140.

The timing controller 140 may store the digital dummy sensing data DSENd transferred from the analog-to-digital converter 138 in the memory 144.

In this case, since the digital dummy sensing data DSENd transferred from the analog-to-digital converter 138 reflects a value whose level has been adjusted by reflecting the range of the input voltage of the analog-to-digital converter 138, it may be scaled back to the range of the subpixel driving voltage EVDD.

FIG. 11 is a view illustrating an example of a lookup table for calculating the intensity of current flowing through a data driving circuit according to a variation width of a subpixel driving voltage in a display device according to aspects of the disclosure.

Referring to FIG. 11, in the display device 100 according to aspects of the disclosure, digital dummy sensing data DSENd corresponding to the scaled subpixel driving voltage EVDD_S indicates a value within 3 V which is the input voltage range of the analog-to-digital converter 138. Thus, the second scaler 146 may scale the digital dummy sensing data DSENd back to the level of the subpixel driving voltage EVDD having a magnitude of about 27V.

The current calculation circuit 148 may calculate the current intensity transferred through the data driving circuit 130 where the digital dummy sensing data DSENd has been detected, based on the data scaled to the level of the subpixel driving voltage EVDD.

In this case, the current intensity corresponding to the variation width of the subpixel driving voltage EVDD detected from the data driving circuit 130 and the subpixel driving voltage EVDD supplied from the power management circuit 150 may be stored, in the form of a lookup table, in the memory 144, and the current calculation circuit 148 may calculate the current intensity transferred through the data driving circuit 130, by referring to the lookup table stored in the memory 144.

The compensation circuit 142 may compensate for the image data DATA transferred to the data driving circuit 130 based on the current intensity of the subpixel driving voltage EVDD transferred from the current calculation circuit 148 and output the compensated digital image data DATA_comp to the data driving circuit 130.

For example, as the current intensity transferred through the first data driving circuit group 130 #1 is increased, the temperature of the first data driving circuit group 130 #1 may be increased as compared with the other data driving circuit groups.

In this case, the subpixel driving voltage EVDD transferred through the first data driving circuit group 130 #1 may be decreased due to the increase in the temperature of the first data driving circuit group 130 #1.

The subpixel driving voltage EVDD transferred through the first data driving circuit group 130 #1 may be detected through the dummy channel CHd, and the timing controller 140 may calculate the variation width by comparing the digital dummy sensing data DSENd detected through the dummy channel CHd with the subpixel driving voltage EVDD supplied from the power management circuit 150.

Accordingly, the timing controller 140 is able to detect the increase in temperature and the current intensity transferred through the first data driving circuit group 130 #1 based on the variation width of the subpixel driving voltage EVDD, compensate for it and supply the compensated digital image data DATA_comp to the first data driving circuit group 130 #1.

Through the process, it is possible to compensate for the change in temperature and quality of the data driving circuit 130 by the subpixel driving voltage EVDD, so that the defects of the data driving circuit 130 may be prevented, and image quality may be enhanced.

Figure 12:
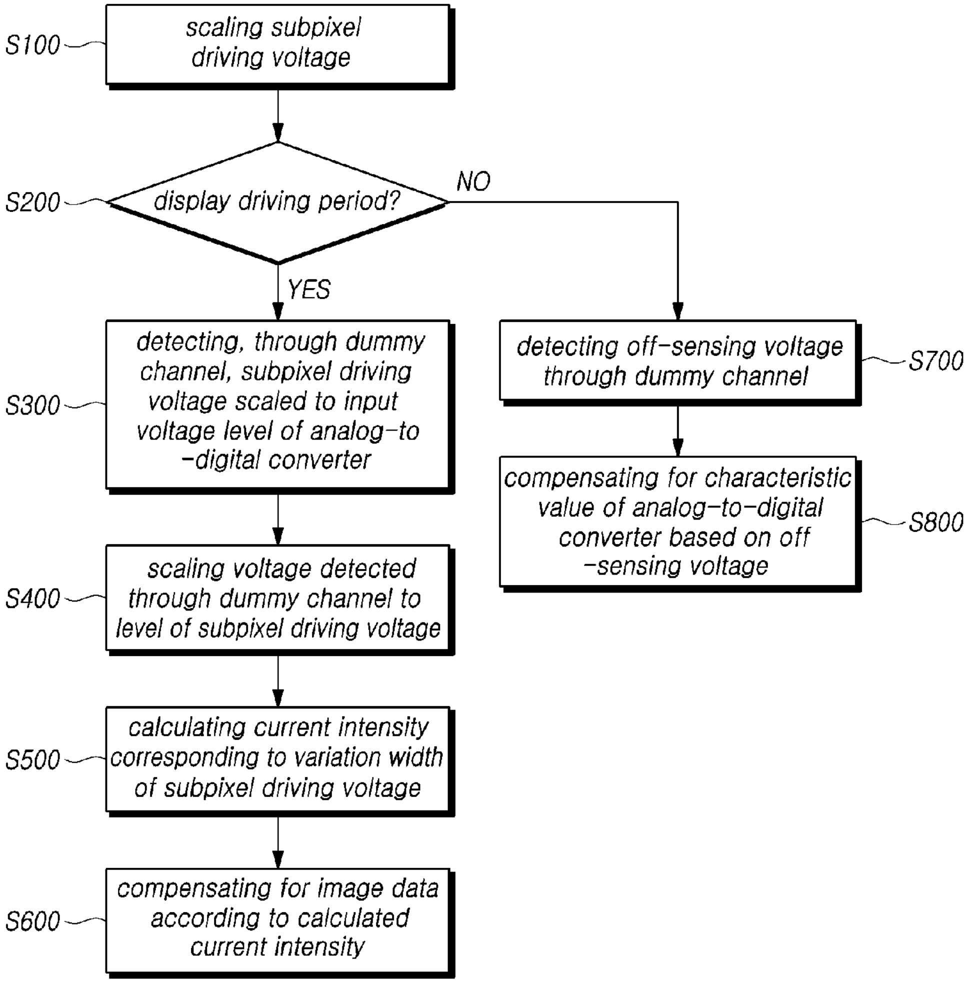
FIG. 12 is a flowchart illustrating a display driving method according to aspects of the present disclosure.

FIG. 12 is a flowchart illustrating a display driving method according to aspects of the disclosure.

Referring to FIG. 12, a display driving method according to aspects of the disclosure may include the step S100 of scaling a subpixel driving voltage EVDD, the step S200 of determining whether it is in a display driving period, the step S300 of detecting, through a dummy channel CHd, a subpixel driving voltage EVDD_S scaled to a level of an input voltage of the analog-to-digital converter 138 during the display driving period, the step S400 of scaling a signal detected through the dummy channel CHd to a level of the subpixel driving voltage EVDD, the step S500 of calculating a current intensity corresponding to a variation width of the subpixel driving voltage EVDD, and the step S600 of compensating for image data DATA according to the calculated current intensity.

For example, when it is determined that it is not in the display driving period, that is, in a non-display driving period, in step 200 ("NO" in step 200), the display driving method may further include the step S700 of detecting an off-sensing voltage VRTA through the dummy channel CHd during the non-display driving period. Furthermore, the display driving method may further include the step S800 of compensating for a characteristic value of the analog-to-digital converter 138 based on the off-sensing voltage VRTA by a timing controller 140.

The step S100 of scaling the subpixel driving voltage EVDD is a process for scaling a high level of subpixel driving voltage EVDD to fit an input voltage range of the analog-to-digital converter 138.

The step S300 of detecting, through the dummy channel CHd, the subpixel driving voltage EVDD_S scaled to the level of the input voltage of the analog-to-digital converter 138 during the display driving period is a process for supplying, to the dummy channel CHd, the subpixel driving voltage EVDD_S scaled to the input voltage level of the analog-to-digital converter 138 within a period during which an image is displayed on the display panel 110, and the analog-to-digital converter 138 detects the scaled subpixel driving voltage EVDD_S.

The step S400 of scaling the signal detected through the dummy channel CHd to the level of the subpixel driving voltage EVDD is a process in which if the digital dummy sensing data DSENd transferred from the analog-to-digital converter 138 is transferred to the timing controller 140, the timing controller 140 scales the digital dummy sensing data DSENd back to the level of the subpixel driving voltage EVDD supplied from the power management circuit 150.

The step S500 of calculating the current intensity corresponding to the variation width of the subpixel driving voltage EVDD is a process for calculating the intensity of the current flowing through the data driving circuit 130 according to the variation width of the voltage detected from the data driving circuit 130 and the subpixel driving voltage EVDD supplied from the power management circuit 150.

The step S600 of compensating for the image data DATA according to the calculated current intensity is a process for compensating for the image data DATA to be able to reduce the temperature of the data driving circuit 130 considering the intensity of the current flowing through the data driving circuit 130.

The step S700 of detecting the off-sensing voltage VRTA through the dummy channel CHd during a non-display driving period is a process for detecting the off-sensing voltage VRTA through the dummy channel CHd when an off-sensing process proceeds.

The step S800 of compensating for the characteristic value of the analog-to-digital converter 138 based on the off-sensing voltage VRTA by the timing controller 140 is a process for compensating for the gain or offset of the analog-to-digital converter 138 based on the detected off-sensing voltage VRTA.

The foregoing aspects are briefly described below.

A display device 100 according to aspects of the disclosure comprises a display panel 110 including a plurality of sensing channels CH connected to a plurality of subpixels SP to detect a driving characteristic value, a data driving circuit 130 including an analog-to-digital converter 138 configured to convert a sensing voltage detected through the plurality of sensing channels CH into digital sensing data DSEN and convert a subpixel driving voltage EVDD detected through at least one dummy channel CHd into digital dummy sensing data DSENd, and a timing controller 140 configured to calculate an intensity of a current flowing through the data driving circuit 130 based on the digital dummy sensing data DSENd transferred from the data driving circuit 130 and compensate for image data to be transferred to the data driving circuit 130.

The data driving circuit 130 includes a first scaler 136 configured to convert the subpixel driving voltage EVDD into an input voltage level of the analog-to-digital converter 138.

The data driving circuit 130 includes a switching circuit 137 configured to select the subpixel driving voltage EVDD or an off-sensing voltage VRTA and transfer the selected voltage to the at least one dummy channel CHd.

The switching circuit 137 includes a first switch SW1 configured to transfer the subpixel driving voltage EVDD to the at least one dummy channel CHd during a display driving period, a second switch SW2 configured to transfer the off-sensing voltage VRTA to the at least one dummy channel CHd during an off-sensing process period, and an inverter INV configured to invert a signal applied to the first switch SW1 and apply the inverted signal to the second switch SW2.

The timing controller 140 includes a memory 144 configured to store the digital dummy sensing data DSENd, a current calculation circuit 148 configured to compare a subpixel driving voltage EVDD transmitted from a power management circuit 150 with the digital dummy sensing data DSENd to calculate the intensity of the current flowing through the data driving circuit 130, and a compensation circuit 142 configured to compensate for the image data to be transferred to the data driving circuit 130 according to a value calculated by the current calculation circuit 148.

The timing controller 140 further includes a second scaler 146 configured to scale the digital dummy sensing data DSENd back to a level of the subpixel driving voltage EVDD.

A data driving circuit 130 according to aspects of the disclosure comprises a plurality of data lines DL extending to a display panel 110 including plurality of subpixels SP, configured to supply a data voltage Vdata and an analog-to-digital converter 138 configured to convert a sensing voltage Vsen detected through the plurality of sensing channels CH into digital sensing data DSEN and convert a subpixel driving voltage EVDD detected through at least one dummy channel CHd into digital dummy sensing data DSENd.

The data driving circuit 130 further includes a scaler 136 configured to convert the subpixel driving voltage EVDD into an input voltage level of the analog-to-digital converter 138.

The data driving circuit 130 further includes a switching circuit 137 configured to select the subpixel driving voltage EVDD or an off-sensing voltage VRTA and transfer the selected voltage to the at least one dummy channel CHd.

The switching circuit 137 includes a first switch SW1 configured to transfer the subpixel driving voltage EVDD to the at least one dummy channel CHd during a display driving period, a second switch SW2 configured to transfer the off-sensing voltage VRTA to the at least one dummy channel CHd during an off-sensing process period, and an inverter INV configured to invert a signal applied to the first switch SW1 and apply the inverted signal to the second switch SW2.

The data driving circuit 130 receives compensation data for compensating for a data voltage Vdata supplied to the display panel 110 according to a result of comparison between a subpixel driving voltage EVDD output from a power management circuit 150 and the digital dummy sensing data DSENd.

A method for driving a display device according to aspects of the disclosure, including a display panel 110 having a plurality of subpixels SP, a data driving circuit 130 including an analog-to-digital converter 138 converting a sensing voltage Vsen detected through a plurality of sensing channels CH into digital sensing data DSEN, and a timing controller 140 supplying image data DATA to the data driving circuit 130, comprises detecting a subpixel driving voltage EVDD through a dummy channel CHd, calculating a current intensity corresponding to a variation width of the subpixel driving voltage EVDD, and compensating for the image data DATA supplied to the data driving circuit 130 according to the calculated current intensity.

The subpixel driving voltage EVDD is a voltage scaled to a level of an input voltage of the analog-to-digital converter 138.

The subpixel driving voltage EVDD is detected during a display driving period.

The display driving method further comprises detecting an off-sensing voltage VRTA through the dummy channel CHd during a non-display driving period and compensating for a characteristic value of the analog-to-digital converter 138 based on the off-sensing voltage VRTA.

Calculating the current intensity further includes scaling the voltage scaled to the level of the input voltage of the analog-to-digital converter 138, back to a level of the subpixel driving voltage EVDD.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device, comprising:

a display panel including a plurality of sensing channels configured to detect a driving characteristic value and connected to a plurality of subpixels;

a data driving circuit including an analog-to-digital converter configured to convert a sensing voltage detected through the plurality of sensing channels into digital sensing data and convert a subpixel driving voltage detected through at least one dummy channel into digital dummy sensing data; and a timing controller configured to calculate an intensity of a current flowing through the data driving circuit based on the digital dummy sensing data transferred from the data driving circuit and compensate for image data to be transferred to the data driving circuit, wherein the data driving circuit includes a switching circuit configured to select the subpixel driving voltage or an off-sensing voltage and transfer the selected voltage to the at least one dummy channel.

2. The display device of claim 1, wherein the data driving circuit includes a first scaler configured to convert the subpixel driving voltage into an input voltage level of the analog-to-digital converter.

3. The display device of claim 1, wherein the switching circuit includes:

a first switch configured to transfer the subpixel driving voltage to the at least one dummy channel during a display driving period;

a second switch configured to transfer the off-sensing voltage to the at least one dummy channel during an off-sensing process period; and an inverter configured to invert a signal applied to the first switch and apply the inverted signal to the second switch.

4. The display device of claim 1, wherein the timing controller includes:

a memory configured to store the digital dummy sensing data;

a current calculation circuit configured to compare a subpixel driving voltage transmitted from a power management circuit with the digital dummy sensing data to calculate the intensity of the current flowing through the data driving circuit; and a compensation circuit configured to compensate for the image data to be transferred to the data driving circuit according to a value calculated by the current calculation circuit.

5. The display device of claim 4, wherein the timing controller further includes a second scaler configured to scale the digital dummy sensing data back to a level of the subpixel driving voltage.

6. A data driving circuit, comprising:

a plurality of data lines extended to a display panel, including a plurality of subpixels, and configured to supply a data voltage;

an analog-to-digital converter configured to convert a sensing voltage detected through a plurality of sensing channels into digital sensing data and convert a subpixel driving voltage detected through at least one dummy channel into digital dummy sensing data, and a switching circuit configured to select the subpixel driving voltage or an off-sensing voltage and transfer the selected voltage to the at least one dummy channel.

7. The data driving circuit of claim 6, further comprising a scaler configured to convert the subpixel driving voltage into an input voltage level of the analog-to-digital converter.

8. The data driving circuit of claim 6, wherein the switching circuit includes:

a first switch configured to transfer the subpixel driving voltage to the at least one dummy channel during a display driving period;

a second switch configured to transfer the off-sensing voltage to the at least one dummy channel during an off-sensing process period; and an inverter configured to invert a signal applied to the first switch and apply the inverted signal to the second switch.

9. The data driving circuit of claim 6, wherein the data driving circuit receives compensation data for compensating for a data voltage supplied to the display panel according to a result of comparison between a subpixel driving voltage output from a power management circuit and the digital dummy sensing data.

10. A method for driving a display device including a display panel, where a plurality of subpixels are disposed, a data driving circuit including an analog-to-digital converter converting a sensing voltage detected through a plurality of sensing channels into digital sensing data, and a timing controller supplying image data to the data driving circuit, the method comprising:

detecting a subpixel driving voltage through a dummy channel;

calculating a current intensity corresponding to a variation width of the subpixel driving voltage;

compensating for the image data supplied to the data driving circuit according to the calculated current intensity, detecting an off-sensing voltage through the dummy channel during a non-display driving period; and compensating for a characteristic value of the analog-to-digital converter based on the off-sensing voltage, wherein the subpixel driving voltage is detected during a display driving period.

11. The method of claim 10, wherein the subpixel driving voltage is a voltage scaled to a level of an input voltage of the analog-to-digital converter.

12. The method of claim 11, wherein calculating the current intensity further includes scaling the voltage scaled to the level of the input voltage of the analog-to-digital converter, back to a level of the subpixel driving voltage.

* * * * *